(12) United States Patent
Gonthier

(10) Patent No.: US 7,351,473 B2
(45) Date of Patent: Apr. 1, 2008

(54) SIZED GLASS YARNS, SIZING COMPOSITION AND COMPOSITES COMPRISING SAID YARNS

(75) Inventor: Michel Gonthier, Jacob Bellecombette (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 0 days.

(21) Appl. No.: 11/484,652

(22) Filed: Jul. 12, 2006

(65) Prior Publication Data

US 2006/0251894 A1 Nov. 9, 2006

Related U.S. Application Data

(63) Continuation of application No. 10/466,119, filed as application No. PCT/FR01/04066 on Dec. 19, 2001, now abandoned.

(30) Foreign Application Priority Data

Jan. 24, 2001 (FR) .................................. 01 00910

(51) Int. Cl.
*B32B 9/00* (2006.01)
*D06M 15/333* (2006.01)

(52) U.S. Cl. ...................... 428/392; 428/375; 428/391; 252/8.83; 523/200

(58) Field of Classification Search ...................... None
See application file for complete search history.

(56) References Cited

U.S. PATENT DOCUMENTS

| 3,729,496 A | 4/1973 | Berger |
|---|---|---|
| 3,773,819 A | 11/1973 | Berger |
| 4,668,716 A | 5/1987 | Pepe et al. |
| 4,689,085 A | 8/1987 | Plueddemann |
| 5,013,771 A | 5/1991 | Guillet et al. |
| 6,183,676 B1 | 2/2001 | Gonthier |
| 6,506,314 B1 | 1/2003 | Whitney et al. |
| 2004/0096659 A1 | 5/2004 | Gonthier |

FOREIGN PATENT DOCUMENTS

| DE | 16 94 008 | 3/1971 |
|---|---|---|
| WO | 94 11318 | 5/1994 |
| WO | WO 98/18737 | 5/1998 |

*Primary Examiner*—Jill Gray
(74) *Attorney, Agent, or Firm*—Oblon, Spivak, McClelland, Maier & Neustadt, P.C.

(57) ABSTRACT

The invention relates to glass strands coated with an essentially aqueous sizing composition which comprises the combination
of at least one bissilane (A) of formula

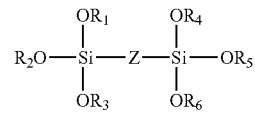

in which:
$R_1$, $R_2$, $R_3$, $R_4$, $R_5$ and $R_6$, which are identical or different, represent a $C_1$-$C_6$, preferably $C_1$-$C_3$, alkyl radical,
Z represents a $C_1$-$C_6$ hydrocarbonaceous chain which can comprise one or more N, O and/or S heteroatoms,
and of at least one unsaturated monosilane (B) chosen from vinylsilanes and (meth)acrylosilanes.

The glass strands obtained exhibit an improved ability to be cut which renders them capable of being used to reinforce polymers, in particular by moulding by simultaneous spraying.

20 Claims, No Drawings

SIZED GLASS YARNS, SIZING COMPOSITION AND COMPOSITES COMPRISING SAID YARNS

CROSS-REFERENCE TO A RELATED APPLICATION

The present application is a continuation application of U.S. Ser. No. 10/466,119, filed on Dec. 15, 2003 now abandoned, which is a National Stage (371) of International Application PCT/FR01/04066, filed Dec. 19, 2001, which claims priority to French application FR01/00910, filed on Jan. 24, 2001.

The invention relates to glass strands coated with a sizing composition which are intended to reinforce organic materials of the polymer type, to the sizing compositions used to coat these strands and to the composites including these strands.

Glass strands used for reinforcing are generally produced industrially from streams of molten glass flowing from the multiple orifices of a spinneret. These streams are drawn mechanically in the form of continuous filaments and are then gathered together into base strands, which are subsequently collected, for example by winding off on a rotating support. Before they are gathered together, the filaments are coated with a sizing composition by passing over a suitable device, such as coating rolls.

The sizing composition proves to be essential in several respects. First of all, it is involved in the manufacture of the strands by protecting the glass filaments from the abrasion which occurs when the latter rub at high speed over the members which are used to guide them and to collect them. Next, the sizing composition makes it possible to give cohesion to the strand by creating bonds between its constituent filaments. The strand thus being rendered more integral is thereby easier to handle. Finally, the sizing composition promotes the wetting and the impregnation of the glass strands by the polymer to be reinforced, which, at this stage, has the appearance of a fluid resin. The mechanical properties of the final composite are for this reason markedly improved.

The materials to be reinforced can combine with the glass strands in various forms: continuous or cut strands, fabrics, mats of continuous or cut strands, and the like.

The composites incorporating cut glass strands can be obtained, inter alia, by the "contact moulding" technique, which consists in coating the inside of an open mould, without a countermould, with the resin to be reinforced and glass strands of variable length. In the specific process of "moulding by simultaneous spraying", the resin and the cut glass strands are sprayed together onto the inside walls of the mould by means of a "spray gun" comprising a cutter capable of severing the strands drawn off from one or more wound packages, generally in the form of rovings, and a device for feeding with resin, for example a pneumatic pump. This process, which is simple and which can be adjusted both with regard to the size and the shape, is particularly suited to the manufacture of one-off or short-run components based on thermosetting polymer from the family of the polyesters or epoxides.

The quality of the composites obtained by this process depends largely on the properties introduced by the glass strands and thus on the sizing composition which coats them. The target is in particular sizing compositions which can be easily wetted or impregnated at the surface by the resin, that is to say which are capable of providing close contact between the strands and the resin, so that the expected mechanical reinforcing properties can be obtained.

It is also desired for these compositions to make fast processing possible, in particular for the strand/resin mixture which is sprayed onto the mould in the form of overlapping strips to be able to spread out uniformly, and for the subsequent rolling stage, intended to remove the air bubbles and to provide better distribution of the strands in the resin, to be of short duration.

Furthermore, however, it is necessary for the sizing composition to have a degree of "incompatibility" with the resin, that is to say not to be too soluble in the resin, in order to prevent the strand/resin mixture, after spraying onto a vertical wall, from "collapsing" by simple gravity.

It is just as necessary for the cut strands to retain their integrity and not to open with the release of their constituent filaments, both during the spraying and during the rolling/debubbling.

It is thus seen that such compositions are difficult to develop as the targeted properties are rarely compatible with one another and that it is for this reason necessary to achieve compromises.

One of the problems encountered during the implementation of the process for moulding by simultaneous spraying is the excessively short lifetime of the blades with which the spray gun is equipped. Although being made of hard steel, the blades of the cutter have a tendency to rapidly wear out on contact with the glass, which leads to "false cuts" and the appearance of cut strands with a length greater than the desired length. Depending upon the number of blades, their degree of wear and the position which they occupy on the cutter, it is possible to obtain a mixture of strands with a length corresponding to a whole multiple of the expected length. The false cuts result in an unevenness in the sheet of sprayed fibre, which is harmful to the quality of the moulded component and necessitates an interruption in the manufacture in order for the old blades to be changed, leading to a fall in productivity.

Glass strands suited to the production of components by moulding by simultaneous spraying are disclosed in particular in FR-A-2 755 127. These strands are coated with a composition which comprises, in addition to adhesion agents capable of providing the sizing function, the combination of an aminosilane and an unsaturated silane. Although presented as improving the ability of the strand to be cut, the combination of the two abovementioned silanes does not make it possible to achieve the desired objective, namely that the longevity of the blades is insufficient to meet current productivity standards, which require being able to operate continuously for approximately ten hours.

An aim of the invention is to develop glass strands coated with a sizing composition which is particularly suited to the process for moulding by simultaneous spraying and which makes it possible to increase the lifetime of the blades of the cutter without, however, modifying the processing conditions and without affecting the other properties of the strands, namely their ability to be impregnated by the resin. As was indicated above, this is because it is essential for the strands to be able to be rapidly impregnated by the resin as there is, in this instance, no prior blending of the strands and the resin before the spraying stage.

A subject-matter of the present invention is therefore glass strands coated with an essentially aqueous sizing composition which is characterized in that it comprises the combination of at least one bissilane (A) of formula

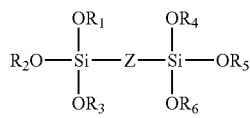

in which:
R$_1$, R$_2$, R$_3$, R$_4$, R$_5$ and R$_6$, which are identical or different, represent a C$_1$-C$_6$, preferably C$_1$-C$_3$, alkyl radical Z represents a C$_1$-C$_{16}$ hydrocarbonaceous chain which can comprise one or more N, O and/or S heteroatoms and of at least one unsaturated monosilane (B) chosen from vinylsilanes and (meth)acrylosilanes.

In the present invention, the term "glass strands coated with a sizing composition" is understood to mean glass strands "which have been coated with a sizing composition which comprises . . . ", that is to say not only glass strands coated with the composition in question as they are obtained at the immediate outlet of the sizing member(s) but also these same strands after they have been subjected to one or more other treatments, for example a stage(s) of drying, for the purpose of removing the solvent from the composition, and/or of polymerization/crosslinking of some constituents of the said composition.

Still in the context of the invention, the term "strands" should be understood as meaning the base strands resulting from the gathering together under the spinneret of a multitude of filaments and the products derived from these strands, in particular the assemblages of these base strands into rovings. Such assemblages can be obtained by simultaneously reeling off several wound base strand packages and by then gathering them together into slivers which are wound off onto a rotating support. It can also be "direct" rovings with a count (or mass per unit length) equivalent to that of the assembled rovings obtained by gathering together filaments directly under the spinneret and winding onto a rotating support.

Still-according to the invention, the-term "essentially aqueous sizing-composition" is understood to mean a composition which comprises at least 90% by weight of water, preferably at least 93% and better still at least 94%, at least one adhesion agent and at least one lubricant.

According to a preferred embodiment of the invention, the glass strands are coated with a sizing composition, the bissilane (A) of which corresponds to the formula

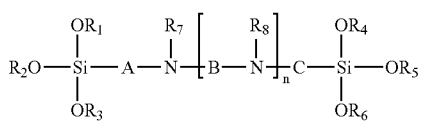

in which:
R$_1$, R$_2$, R$_3$, R$_4$, R$_5$ and R$_6$ have the meaning given above,
A, B and C, which are identical or different, represent a C$_1$-C$_{16}$ hydrocarbonaceous chain, the sum of the carbon atoms of A, B and C being less than or equal to 16,
n is equal to 0, 1, 2 or 3,
R$_7$ and R$_8$, which are identical or different, represent H or a methyl or ethyl radical.
Preferably, the sizing composition comprises the bissilane (A) of abovementioned formula in which:

R$_1$, R$_2$, R$_3$, R$_4$, R$_5$ and R$_6$, which are identical, represent a methyl or ethyl radical,
A and C, which are identical or different, represent a methylene, ethylene or propylene radical,
B represents an ethylene radical,
n is equal to 0 or 1,
R$_7$ and R$_8$ represent a hydrogen atom.
In a particularly preferred way, the bissilane (A) corresponds to the preceding formula, in which:
R$_1$, R$_2$, R$_3$, R$_4$, R$_5$ and R$_6$, which are identical, represent a methyl radical,
A and C represent a propylene radical,
n is equal to 0,
R$_7$ and R$_8$ represent a hydrogen atom.
According to another embodiment of the invention, the glass strands are coated with a sizing composition, the unsaturated monosilane (B) of which is chosen from (meth)acrylosilanes.

The combination of the bissilane (A) and of the unsaturated monosilane (B) proves to be advantageous for forming glass strands exhibiting an improved ability to be cut. It has been found that the bissilane (A) is a very effective agent for embrittling glass: a very dilute aqueous solution of this bissilane, of the order of 0.01% by weight, is sufficient to produce the desired effect. It seems that the embrittling effect is related to the high affinity of the bissilane for glass: this is explained by the formation of relatively strong bonds between the silicon atoms carried by the bissilane and the oxygen of the free hydroxyl groups of the glass, which bonds lead to embrittlement of the glass at the surface. By introducing the monosilane (B) into the composition, which monosilane acts as a "protective" agent opposing the cutting action of the bissilane (A), it is possible to adjust the ability of the strand to be cut. Generally, entirely satisfactory results are obtained with a bissilane (A)/monosilane (B) ratio by weight of between 0.1 and 6, preferably 0.3 and 3 and better still 0.6 and 2.

Mention may be made, as examples of preferred monosilanes (B), of
for the vinylsilanes: vinyltrialkoxysilanes, in particular vinyltriethoxysilane and vinyltri(methoxyethoxy)silane,
for the (meth)acrylosilanes [(meth)acryloxyalkyl]trialkoxysilanes, in particular (methacryloxypropyl)triethoxysilane, and (meth)acrylamidoalkyltrialkoxysilanes, in particular methacrylamidopropyltrialkoxysilane.
(Meth)acrylamidoalkyltrialkoxysilanes are particularly preferred.

Glass strands coated with a sizing composition combining aminobis(propyltrimethoxysilane) and methacrylamidopropyltrialkoxysilane have proved to be particularly advantageous for the targeted application of moulding by simultaneous spraying.

In accordance with the definition given above, the sizing composition coating the glass strands comprises at least one adhesion agent. This adhesion agent is generally chosen from homopolymers or copolymers based on vinyl acetate, polyurethanes, epoxys and polyesters.

Mention may be made, by way of examples of vinyl acetate homopolymers, of poly(vinyl acetate)s having a low molecular mass, that is to say of less than or equal to 60 000, preferably of between 40 000 and 60 000, and better still of the order of 50 000.

Mention may be made, by way of examples of copolymers based on vinyl acetate, of copolymers of vinyl acetate and of at least one other monomer capable of copolymerizing with the latter, such as an unsaturated monomer, in particular ethylene and N-methylolacrylamide, or a monomer including an epoxide functional group.

Mention may be made, by way of examples of polyurethanes, of the compounds obtained by reaction of at least one polyisocyanate and of at least one polyol. The polyurethanes resulting from polyols with aliphatic and/or cycloaliphatic chains are preferred.

Mention may be made, by way of examples of epoxys, of the compounds exhibiting an epoxide number of less than 450, preferably of greater than 180, resulting in particular from the reaction of bisphenol A and epichlorohydrin, in the form of an aqueous emulsion, or modified in order to render them soluble in water.

Mention may be made, by way of examples of polyesters, of saturated or slightly unsaturated polyesters. These polyesters are generally used in the form of an aqueous emulsion.

The composition advantageously comprises the combination of at least two adhesion agents, at least one of which is a poly(vinyl acetate) or a polyurethane. Preferably, the choice is made to combine a poly(vinyl acetate) or a polyurethane and a copolymer based on vinyl acetate, or a poly(vinyl acetate) and a polyurethane. In a particularly preferred way, a poly(vinyl acetate) and a vinyl acetate/N-methylolacrylamide copolymer, a polyurethane and a vinyl acetate/epoxide or ethylene/vinyl acetate (EVA) copolymer, and a polyurethane and a poly(vinyl acetate) are combined.

In addition, a plasticizing agent can be introduced into the sizing composition, the role of which plasticizing agent is to render more flexible the constituent polymer chains of the adhesion agent(s), in particular when they are homopolymers or the vinyl acetate/N-methylolacrylamide copolymer. The plasticizing agent makes it possible to lower the glass transition temperature (Tg) of the adhesion agents, which improves the "conformability" of the blend of cut strands and resin, that is to say the ability to match the shape of the mould, and for this reason proves to be particularly advantageous when the shape is complex. The plasticizing agent is generally chosen from glycol derivatives, such as alkylene glycol dibenzoates and preferably ethylene and/or propylene glycol dibenzoates.

The amount of plasticizing agent in the sizing composition very obviously depends on the degree of flexibility which it is desired to confer on the strand, it being understood that the strand must, however, be sufficiently stiff to allow it to be correctly distributed within the resin. When one or more vinyl acetate homopolymers is/are used, in combination or not in combination with the vinyl acetate/N-methylolacrylamide copolymer, this amount is such that the ratio by weight of the plasticizing agent to the sum of the homopolymers and of the vinyl acetate/N-methylolacrylamide copolymer is between 0.05 and 0.2, preferably 0.10 and 0.15, expressed on a dry basis.

The composition can also comprise at least one lubricating and/or antistatic agent, the role of which is in particular to protect the strands from mechanical abrasion during their manufacture. This agent is generally chosen from cationic compounds of the polyalkyleneimide type and nonionic compounds of the esters of fatty acids and of poly(alkylene glycol)s poly(oxyalkylene) type, such as poly(ethylene glycol) monolaurate, or of the poly(oxyalkylenated) fatty amides type, such as polyoxyethylenated hydrogenated tallow amides.

The glass strands coated with the sizing composition in accordance with the invention exhibit a loss on ignition of less than 1.5%, preferably of between 0.9 and 1.3%.

Generally, the glass strands in accordance with the invention exist in the form of wound base strand packages which are subjected to a heat treatment. This treatment is intended essentially to remove the water introduced by the sizing composition and, if appropriate, to accelerate the crosslinking of the adhesion agents. The conditions for the treatment of the wound packages can vary according to the mass of the wound package. The drying is generally carried out at a temperature of the order of 110 to 140° C. for several hours, preferably 12 to 18 hours.

As has already been said, the base strands thus obtained are generally removed from the wound package and combined with several other base strands into a sliver which is subsequently wound off onto a rotating support to form a roving. It has unexpectedly been found that the application of a composition including a cationic antistatic agent of the quaternary ammonium salt type to the strands makes it possible to reinforce the ability of the strands to be cut. Thus, by depositing the abovementioned composition on the base strands, after removing from the wound package and gathering together to form the sliver, the lifetime of the blades is significantly improved. The strands are preferably coated with an aqueous composition comprising 20 to 35% and preferably of the order of 25% by weight of cocotrimethylammonium chloride.

The strands coated with the sizing composition according to the invention, if appropriate with the composition described in the preceding paragraph, can be composed of glass of any nature provided that it is suitable for fiberizing, for example made of E, C or AR glass and preferably of E glass.

These same strands are composed of filaments with a diameter which can vary within a wide range, for example from 9 to 24 µm, and preferably 10 to 15 µm, and better still 11 to 13 µm.

The strands advantageously have a count of between 40 and 70 tex and better still of the order of 57 tex. For this reason, even when filaments with a relatively large diameter are used, the strand retains an acceptable stiffness and remains capable of perfectly matching the shape of the mould. In addition, the cut glass strands are evenly and homogeneously distributed within the resin during the simultaneous spraying, which makes it possible to have excellent reinforcement.

Another subject-matter of the invention relates to the sizing composition capable of coating the said glass strands, which composition is characterized in that it comprises:
  at least one bissilane (A) corresponding to the abovementioned formula,
  at least one monosilane (B),
  at least one adhesion agent,
  at least one lubricating agent,
  and water.

Preferably, the sizing composition comprises:
  0.05 to 0.4% by weight of bissilane (A),
  0.05 to 0.4% by weight of monosilane (B),
  3.9 to 6.8% by weight of adhesion agent,
  0.01 to 0.4% by weight of lubricating agent,
  and at least 90% of water.

Preferably, the sizing composition comprises at least 93% by weight of water and better still at least 94%.

It is possible to introduce other silanes into the sizing composition. In this case, the total content of silanes does not exceed 1% by weight of the composition, preferably 0.8%.

The solids content of the sizing composition is generally between 2 and 10%, preferably 4 and 8%, and advantageously of the order of 6%.

A subject-matter of the invention also relates to the composites comprising the glass strands coated with the sizing composition. Such composites comprise at least one thermosetting polymer material, preferably a polyester and/or an epoxy, and glass strands, all or part of which is/are composed of glass strands in accordance with the invention. The level of glass within the composite is generally between 20 and 40% by weight and preferably between 25 and 35%. In addition to their improved ability to be cut, the glass strands according to the invention are noteworthy in that they allow the material which they reinforce to have better behaviour towards ageing. This is reflected in particular by a greater resistance to flexural stress and shear stress, as indicated subsequently in the following implementational examples, which are intended to illustrate the invention without, however, limiting it.

EXAMPLE 1 (COMPARATIVE)

Preparation is carried out of a sizing composition comprising (as % by weight)

| | |
|---|---|
| diaminosilane[1] | 0.30 |
| vinyltriethoxysilane[2] | 0.30 |
| adhesion agent: poly(vinyl acetate)[3] (MW 50 000) | 7.75 |
| adhesion agent: copolymer of vinyl acetate and of N-methylolacrylamide[4] | 3.00 |
| plasticizer: mixture of diethylene glycol dibenzoate and of propylene glycol dibenzoate[5] (50:50 ratio by weight) | 0.70 |
| nonionic lubricant: polyethylene glycol 400 monolaurate[6] | 0.30 |
| lubricant: polyethyleneimide with free amide functional groups[7] | 0.05 |
| water | q.s. for 100 |
| formic acid | q.s. for obtaining a pH equal to 4. |

3600 litres of the sizing composition are prepared in the following way:

The aminosilane and then, 20 minutes later, the vinyltriethoxysilane are introduced into a first vessel containing a solution composed of 1800 l of water and 1.5 kg of formic acid (80% by volume). If appropriate, the pH of the solution is adjusted to approximately 4.5 by addition of formic acid.

The two adhesion agents are successively introduced into a second vessel, the mixture is diluted with stirring to approximately 400 litres with water, and the plasticizer and the nonionic lubricant[6] are added. The mixture is left stirring for at least 15 minutes and is diluted with water to 1000 litres.

(6) sold under the reference "Nopalcol® 4L" by HENKEL CORPORATION

By virtue of the combination of the plasticizer and the nonionic lubricant, this "plasticization" stage is short.

The lubricant[7] is introduced into a third vessel and is diluted to 10-20 times its weight with water.

(7) sold under the reference "Emery® 6717" by HENKEL CORPORATION

The plasticized mixture of the second vessel and the lubricant of the third vessel are introduced into the first vessel and the volume is made up with water until a volume of 3 600 l is obtained. If necessary, the pH of the sizing composition thus obtained is adjusted to approximately 4 by addition of formic acid. The solids content of this composition is 7%.

The sizing composition thus obtained is used to coat, in a known way, filaments of E glass with a diameter of approximately 12 μm drawn from streams of molten glass flowing from the 2400 orifices of a spinneret, the filaments subsequently being gathered together in the form of a wound base strand package with a count equal to 57 tex.

The wound package is subsequently dried at 130° C. for 12 hours.

The base strands are removed from the wound package and are gathered together into rovings composed of 42 base strands, constituting a first batch. A second batch of rovings is obtained by removing the base strands from the wound package and application, to the assembled sliver, of an aqueous antistatic solution comprising 25% by weight of cocotrimethylammonium chloride[8] (pH adjusted to 4 by addition of formic acid; level deposited on a dry basis: 0.06%).

(8) sold under the reference "Arquad® C35" by AKZO NOBEL CHEMICALS

The strand unwound from the roving is inserted into a cutting device comprising two blades, a blade made of hard steel and a blade made of rapidly wearing "soft" steel (heat treatment at 550° C.), and strength and temperature sensors. The cutting, carried out at 20° C. under a relative humidity of 40%, is adjusted in order to form cut strands with a length of 25 mm. The ability to be cut is measured by the mass of the glass strands which can be cut until the appearance of a strand with twice the length (2×25 mm). The value 1 is assigned to the mass of cut strands obtained with the strands which have been subjected to the additional stage of antistatic treatment, which value is used here as reference value for measuring the ability to be cut. With the untreated glass strands, the ability to be cut is 0.7.

EXAMPLE 2

The preparation is carried out under the conditions of Example 1, modified in that the silanes participating in the sizing composition are composed of (as % by weight):

| | |
|---|---|
| bissilane: aminobis(propyltrimethoxysilane)[9] | 0.20 |
| unsaturated monosilane: mixture of methacrylamidopropyltrimethoxysilane and of methacrylamidopropyltriethoxysilane[10] | 0.25 |

The measurement of the ability to be cut of the strands coated and not coated with the antistatic agent is 4.5 and 1.5 respectively.

EXAMPLE 3

The preparation is carried out under the conditions of Example 2, modified in that the content of silanes[9] and [10] is 0.16 and 0.20% by weight respectively.

(9) sold under the reference "Silquest® A-1170" by WITCO CORPORATION

(10) sold under the reference "Silquest® Y-5997" by CK WITCO CORPORATION

The measurement of the ability to be cut of the strands coated with the antistatic agent is 4.5.

EXAMPLE 4

The preparation is carried out under the conditions of Example 2, modified in that the content of silanes[9] and [10] is 0.10 and 0.125% by weight respectively.

(9) sold under the reference "Silquest® A-1170" by WITCO CORPORATION
(10) sold under the reference "Silquest® Y-5997" by CK WITCO CORPORATION The measurement of the ability to be cut of the strands coated with the antistatic agent is 1.8.

EXAMPLE 5

The preparation is carried out under the conditions of Example 2, modified in that the content of silanes[9] and [10] is 0.15 and 0.25% by weight respectively.
(9) sold under the reference "Silquest® A-1170" by WITCO CORPORATION
(10) sold under the reference "Silquest® Y-5997" by CK WITCO CORPORATION The measurement of the ability to be cut of the strands coated and not coated with the antistatic agent is 1.3 and 0.6 respectively.

EXAMPLE 6

The preparation is carried out of a sizing composition comprising (as % by weight):

| | |
|---|---|
| bissilane: aminobis(propyltrimethoxysilane)[9] | 0.20 |
| unsaturated monosilane: mixture of methacrylamidopropyltrimethoxysilane and of methacrylamidopropyltriethoxysilane[10] | 0.20 |
| adhesion agent: aliphatic/cycloaliphatic polyurethane[11] | 4.10 |
| adhesion agent: vinyl acetate/epoxide copolymer[12] | 7.70 |
| lubricant: polyoxyethylenated hydrogenated tallow amide[13] | 0.14 |
| lubricant: polyethyleneimide with free amide functional groups[7] | 0.02 |
| LiCl | 0.10 |
| water | q.s. for 100 |
| formic acid | q.s. for obtaining a pH equal to 5. |

The solids content of the sizing composition is 5.85%.

The measurement of the ability to be cut of the strands not coated with the antistatic agent is 2.2.

EXAMPLE 7

The preparation is carried out under the conditions of Example 6, modified in that the content of silane [10] is 0.10% by weight.
(10) sold under the reference "Silquest® A-5997" by CK WITCO CORPORATION The measurement of the ability to be cut of the strands not coated with the antistatic agent is 6.0.

EXAMPLE 8

The preparation is carried out under the conditions of Example 6, modified in that the content of each of the silanes[9] and [10] is 0.17% by weight.
(9) sold under the reference "Silquest® A-1170" by WITCO CORPORATION
(10) sold under the reference "Silquest® Y-5997" by CK WITCO CORPORATION The measurement of the ability to be cut of the strands not coated with the antistatic agent is 2.5.

EXAMPLE 9

The preparation is carried out under the conditions of Example 6, modified in that the content of each of the silanes[9] and [10] is 0.23% by weight.
(9) sold under the reference "Silquest® A-1170" by WITCO CORPORATION
(10) sold under the reference "Silquest® Y-5997" by CK WITCO CORPORATION The measurement of the ability to be cut of the strands not coated with antistatic agent is 2.2.

EXAMPLE 10

The preparation is carried out under the conditions of Example 6, modified in that the content of silanes[9] and [10] is 0.17 and 0.23% by weight respectively.
(9) sold under the reference "Silquest® A-1170" by WITCO CORPORATION
(10) sold under the reference "Silquest® Y-5997" by CK WITCO CORPORATION The measurement of the ability to be cut of the strands not coated with the antistatic agent is 1.3.

EXAMPLE 11

The preparation is carried out under the conditions of Example 6, modified in that the content of silanes[9] and [10] is 0.23 and 0.17% by weight respectively.
(9) sold under the reference "Silquest® A-1170" by WITCO CORPORATION
(10) sold under the reference "Silquest® Y-5997" by CK WITCO CORPORATION The measurement of the ability to be cut of the strands not coated with the antistatic agent is 5.2.

EXAMPLE 12

The preparation is carried out under the conditions of Example 11, modified in that the adhesion agent[12] is replaced by 6.5% by weight of ethylene/vinyl acetate copolymer[14].
(12) sold under the reference "Fulatex® 8022" by H. B. FULLER FRANCE
(14) sold under the reference "Vinamul® 1367" by VINAMUL The measurement of the ability to be cut of the strands coated and not coated with the antistatic agent is 8.1 and 2.7 respectively.

EXAMPLE 13

The preparation is carried out under the conditions of Example 11, modified in that the adhesion agent[12] is replaced by 8.7% by weight of poly(vinyl acetate)[15].
(12) sold under the reference "Fulatex® 8022" by H. B. FULLER FRANCE
(15) sold under the reference "Mowilith® D43" by HOECHST The measurement of the ability to be cut of the strands not coated with the antistatic agent is 5.0.

EXAMPLE 14

The preparation is carried out under the conditions of Example 13, modified in that the content of adhesion agent [11] is 2.55% by weight.
(11) sold under the reference "Neoxil® 9851" by DSM ITALIA The measurement of the ability to be cut of the strands coated and not coated with the antistatic agent is 3.5 and 2.3 respectively.

EXAMPLE 15

The preparation is carried out under the conditions of Example 13, modified in that the content of adhesion agent (15) is 6.8% by weight.
(15) sold under the reference "Mowilith® D43" by HOECHST The measurement of the ability to be cut of the strands not coated with the antistatic agent is 4.1.

EXAMPLES 16 TO 18

The properties of the glass strand coated with the sizing composition are evaluated under the following conditions:
dry spraying The glass strand removed from the roving is introduced into a spray gun (Vénus from Matrasur) which makes it possible to cut it and to spray it horizontally without addition of resin. The quality of the reeling off of the strand and the properties of the cut strands (stiffness, defibration and "clumping") are thus assessed.
simultaneous spraying The evaluation is carried out under the conditions of the dry test of the preceding paragraph, this time in the presence of unsaturated orthophthalic polyester resin (Norsodyne S 2010 V, sold by Cray Valley) which has a viscosity of 5.6 poises at 18° C. and a moderate reactivity and is non-thixotropic. The resin and the cut strands are sprayed simultaneously onto the walls of a mould in the form of a staircase which comprises a vertical wall with a height of 1 m, then a stair with a depth of 0.2 m and a height of 0.2 m, and finally a horizontal wall with a length of 1 m. The appearance of the carpet, the wetting speed, the final impregnation ("core") and the vertical wall strength are evaluated. The content of glass in the final composite is of the order of 30%.
mechanical properties of the composites The glass strand is used to form a plaque with parallel strands according to Standard ISO 9291. Test specimens are cut out from this plaque and are used for measuring the flexural and shear tensile strengths under the conditions of Standards ISO 14125 and 14130 respectively.

The results, corresponding to the glass strands of Examples 1, 2 and 4 which have been subjected to the stage of treatment by the antistatic agent, are collated in Table 1 (Examples 16, 17 and 18 respectively).

In this table, the evaluations relating to the dry spraying and to the simultaneous spraying are defined according to the following scale of values : 1=very poor, 2=poor, 3=fairly good, 4=good and 5=very good.

TABLE 1

|  | Ex. 16 (comparative) | Ex. 17 | Ex. 18 |
|---|---|---|---|
| Dry spraying |  |  |  |
| Stiffness | 4 | 4 | 3.5 |
| Defibration | 3.5 | 4 | 4 |
| "Clumping" | 4.5 | 5 | 5 |
| Simultaneous spraying |  |  |  |
| Appearance of the carpet | 4 | 3.5 | 3.5 |
| Wetting speed | 3 | 2.5 | 3 |
| Final impregnation | 4 | 4.5 | 5 |
| Vertical wall strength | 4 | 5 | 4.5 |
| Plaques with parallel strands |  |  |  |
| Flexural tensile strength (MPa) |  |  |  |
| Initial | 2 426 | 2 588 | 2 602 |
| After 24 hours | 1 436 | 2 201 | 2 003 |

TABLE 1-continued

|  | Ex. 16 (comparative) | Ex. 17 | Ex. 18 |
|---|---|---|---|
| Loss (%) | 41 | 15 | 23 |
| Shear tensile strength (MPa) |  |  |  |
| Initial | 51 | 73 | 69 |
| After 24 hours | 31 | 55 | 43 |
| Loss (%) | 40 | 25 | 38 |

On reading Table 1, it is found that the glass strands of Examples 17 and 18 in accordance with the invention behave on spraying, in particular on dry spraying, similarly to the strands of the prior art illustrated by Example 16. As regards more particularly the simultaneous spraying, it is noticed that, with the strands according to the invention, an improvement in the final impregnation and in the vertical wall strength is even obtained. Although exhibiting a lower level of performance, the appearance of the carpet and the wetting speed remain within limits which are entirely satisfactory for the targeted application.

Furthermore, it should be noted that, in an entirely unexpected way, the composites incorporating the glass strands according to the invention exhibit a markedly improved resistance to ageing. This is because the measurements of flexural tensile strength and shear tensile strength are reflected by a loss (in %) which is less than that of the composites of the comparative example, in particular with the composite using the strands of Example 17.

The glass strands coated with the sizing composition which combines the bissilane (A) and the unsaturated monosilane (B) are therefore remarkable in that they have a better ability to be cut, make possible retention of the mechanical reinforcing properties and make possible better behaviour under ageing conditions, under conventional conditions of use.

The invention claimed is:

1. A glass strand coated with a sizing composition, wherein the composition comprises the combination of:
   at least one bissilane (A) of formula

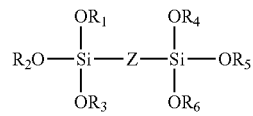

in which
   $R_1, R_2, R_3, R_4, R_5$ and $R_6$, which are identical or different, represent a $C_1$-$C_6$ alkyl radical; and
   Z represents a $C_1$-$C_{16}$ hydrocarbonaceous chain comprising one or more N, O and/or S heteroatoms, Z not comprising exclusively O; and
   at least one unsaturated monosilane (B) selected from (meth)acrylamidoalkyltrialkoxysilanes.

2. The glass strand according to claim 1, wherein bissilane (A) has the formula

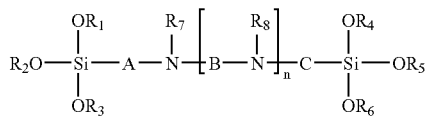

in which
- A, B and C, which are identical or different, represent a $C_1$-$C_{16}$ hydrocarbonaceous chain, the sum of the carbon atoms of A, B and C being less than or equal to 16,
- n is equal to 0, 1, 2 or 3,
- $R_7$ and $R_8$, which are identical or different, represent H or a methyl or ethyl radical.

3. The glass strand according to claim 2, wherein:
- $R_1$, $R_2$, $R_3$, $R_4$, $R_5$ and $R_6$ are identical and represent a methyl or ethyl radical,
- A and C, which are identical or different, represent a methylene, ethylene or propylene radical,
- B represents an ethylene radical,
- n is equal to 0 or 1,
- $R_7$ and $R_8$ represent a hydrogen atom.

4. The glass strand according to claim 3, wherein:
- $R_1$, $R_2$, $R_3$, $R_4$, $R_5$ and $R_6$, are identical and represent a methyl radical,
- A and C represent a propylene radical,
- n is equal to 0,
- $R_7$ and $R_8$ represent a hydrogen atom.

5. The glass strand according to claim 1, wherein the bissilane (A)/monosilane (B) ratio by weight is between 0.1 and 6.

6. The glass strand according to claim 1, wherein the sizing composition further comprises at least one adhesion agent.

7. The glass strand according to claim 1, wherein the sizing composition further comprises at least one lubricating agent.

8. The glass strand according to claim 1, wherein the glass strand comprises filaments having a diameter varying from 9 to 24 μm.

9. The glass strand according to claim 1, having a count of between 40 and 70 tex.

10. The glass strand according to claim 1, having a loss on ignition of less than 1.5%.

11. A sizing compositions, comprising:
at least one bissilane (A) of formula;

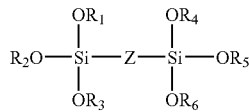

at least one monosilane (B);

at least one adhesion agent;
at least one lubricating agent; and
water;
wherein:
- $R_1$, $R_2$, $R_3$, $R_4$, $R_5$ and $R_6$, which are identical or different, represent a $C_1$-$C_6$ alkyl radical;
- Z represents a $C_1$-$C_6$ hydrocarbonaceous chain comprising one or more N, O and/or S heteroatoms, Z not comprising exclusively O; and
- the at least one monosilane (B) is selected from (meth)acrylamidoalkyltrialkoxy silanes.

12. The sizing composition according to claim 11, comprising:
- 0.05 to 0.4% by weight of bissilane (A),
- 0.05 to 0.4% by weight of monosilane (B),
- 3.9 to 6.8% by weight of adhesion agent,
- 0.01 to 0.4% by weight of lubricating agent,
- and at least 90% of water.

13. The sizing composition according to claim 11, having a solids content of between 2 and 10% by weight.

14. A composite comprising at least one thermosetting polymer material and glass reinforcing strands, wherein all or part of the strands comprise strands according to claim 1.

15. The composite according to claim 14, having 20 to 40% by weight of glass.

16. The composite according to claim 14, wherein the thermosetting polymer material comprises a polyester and/or an epoxy.

17. A glass strand coated with a sizing composition, wherein the composition comprises a combination of:
at least one bissilane (A) of formula

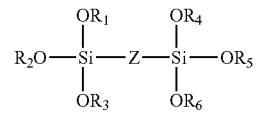

in which
- $R_1$, $R_2$, $R_3$, $R_4$, $R_5$ and $R_6$, which are identical or different, represent a $C_1$-$C_3$ alkyl radical; and
- Z represents a $C_1$-$C_{16}$ hydrocarbonaceous chain comprising one or more N, O and/or S heteroatoms, Z not comprising exclusively O; and
- at least one unsaturated monosilane (B) selected from (meth)acrylamidoalkyltrialkoxysilanes.

18. The glass strand according to claim 1, wherein the bissilane (A)/monosilane (B) ratio by weight is between 0.3 and 3.

19. The glass strand according to claim 1, having a loss on ignition of between 0.9 and 1.3%.

20. The sizing composition according to claim 11 having a solids content of between 4 and 8% by weight.

* * * * *